United States Patent
Boland et al.

(10) Patent No.: US 6,470,776 B1
(45) Date of Patent: Oct. 29, 2002

(54) CLAMPING DEVICE AND METHOD OF OPERATION FOR A CNC MACHINE

(75) Inventors: Patrick Boland, Kew; Anatoly Kaganov, Elsternwick, both of (AU)

(73) Assignee: Anca Pty LTD, Bayswater North (AU)

( * ) Notice: Subject to any disclaimer, the term of this patent is extended or adjusted under 35 U.S.C. 154(b) by 0 days.

(21) Appl. No.: 09/486,443

(22) PCT Filed: Aug. 14, 1998

(86) PCT No.: PCT/AU98/00644

§ 371 (c)(1),
(2), (4) Date: May 10, 2000

(87) PCT Pub. No.: WO99/10785

PCT Pub. Date: Mar. 4, 1999

(30) Foreign Application Priority Data

Aug. 25, 1997 (AU) .................................. PO8768

(51) Int. Cl.⁷ ........................ B23B 7/00; B23B 9/00
(52) U.S. Cl. .................... 82/118; 82/133; 82/165; 82/167
(58) Field of Search ................ 82/118, 1.3, 133, 82/134, 165, 166, 167; 279/119, 2.12

(56) References Cited

U.S. PATENT DOCUMENTS

| | | | | |
|---|---|---|---|---|
| 1,146,193 A | * | 7/1915 | Miller | 279/119 |
| 2,426,376 A | * | 8/1947 | Smallpiece | 279/119 |
| 3,610,643 A | * | 10/1971 | Thompson | 279/2.12 |
| 3,861,252 A | * | 1/1975 | Stoffels et al. | 82/165 |
| 4,318,293 A | * | 3/1982 | Lothar et al. | 72/362 |
| 4,564,914 A | * | 1/1986 | Ballough et al. | 364/475 |
| 4,664,003 A | * | 5/1987 | Avery | 82/165 |
| 5,396,821 A | | 3/1995 | Okumura et al. | |

FOREIGN PATENT DOCUMENTS

EP 545 655 6/1993

OTHER PUBLICATIONS

Patent Abstract of Japan JP 07198336A (Ricoh Co. Ltd.) Aug. 1, 1995.
Patent Abstract of Japan JP 09101812A (Fanuc Ltd.) Apr. 15, 1997.

\* cited by examiner

Primary Examiner—Henry Tsai
(74) Attorney, Agent, or Firm—Andrus, Sceales, Starke & Sawall, LLP

(57) ABSTRACT

A computer numerically controlled (CNC) machine has a chuck (2) rotatable about a first axis (A) and a V-block clamp (#) for clamping a workpiece (4) with its central longitudinal axis (C) extending parallel to the first axis (A). The offset (d) between the axes (A) and (C) is known or calculated and the CNC machine is programmed to compensate for the offset (d) during operation of a cutting tool (5) upon the workpiece (4). The V-block clamp (3) can accommodate workpieces of different diameters without having to align the central longitudinal axis (C) of each workpiece to coincide with the axis of rotation of the chuck (2), resulting in a reduction in set up time and an increased concentricity of a ground workpiece compared with conventional CNC grinding machines.

24 Claims, 4 Drawing Sheets

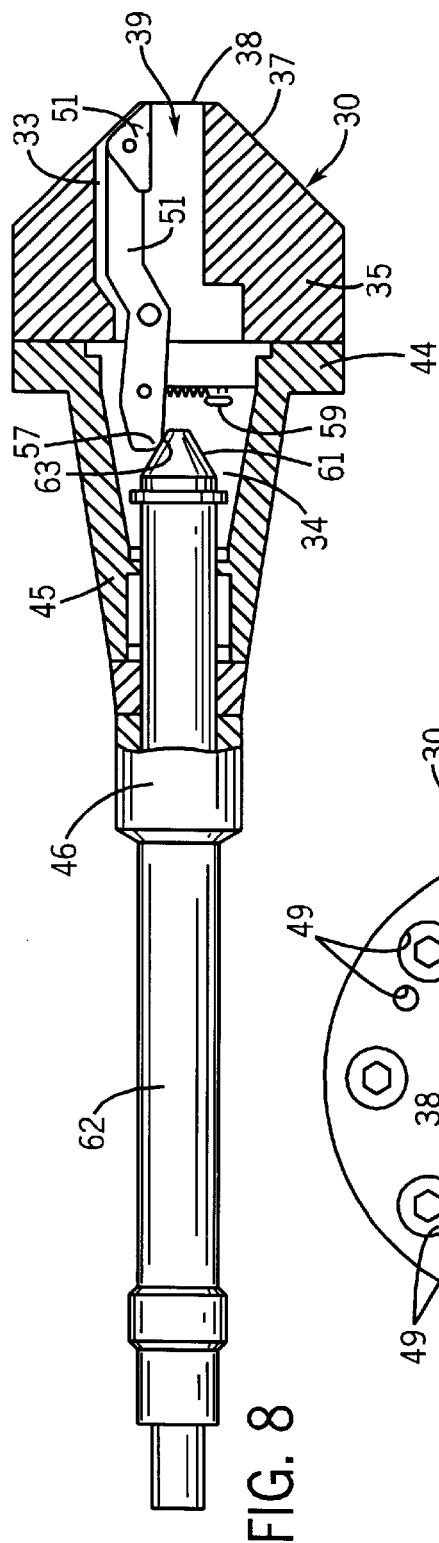
FIG. 8
FIG. 7
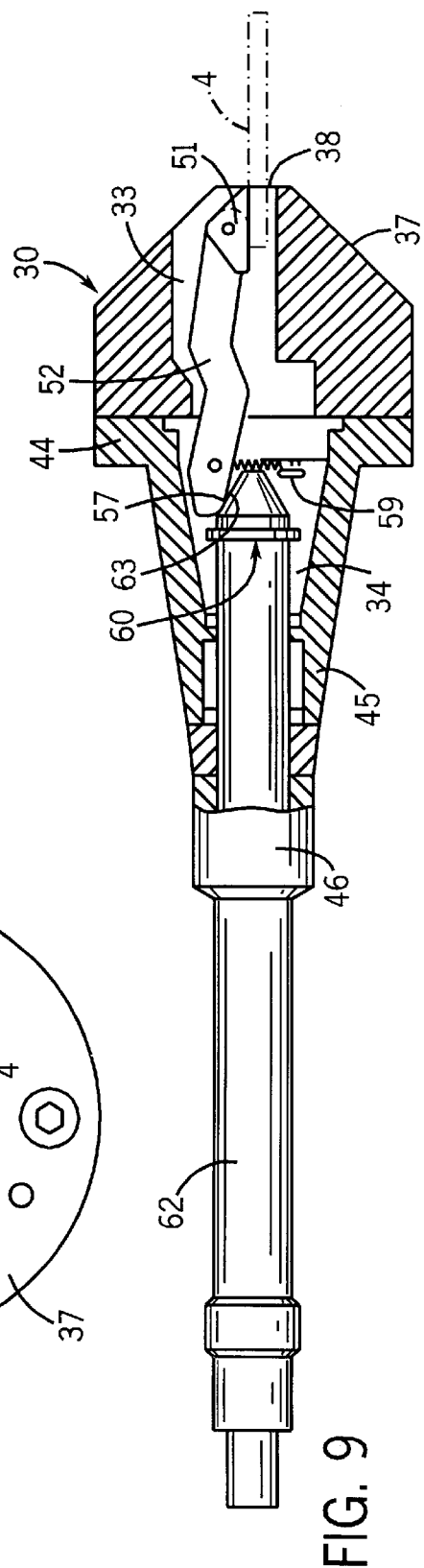
FIG. 9

CLAMPING DEVICE AND METHOD OF OPERATION FOR A CNC MACHINE

BACKGROUND OF THE INVENTION

This invention relates to multi-axis computer numerically controlled (CNC) machines having a cutting tool that is designed to operate upon a workpiece. In the context of this invention, the term cutting tool is not restricted to standard turning or milling cutters, but also includes all mechanical, electronic and/or electromechanical devices used to modify the shape of a workpiece. Examples of cutting tools include: end-mills, turning tools, grinding wheels, laser cutting beams, plasma beams and punch tools. This invention is particularly applicable to a CNC machine in which a cutting tool, such as a grinding wheel, is moved to operate on a workpiece mounted in a rotatable chuck or headstock.

The development of multi axes and multifunction machine tools in conjunction with the development of sophisticated computer controlled operations has facilitated the emergence of a generation of very high speed precision machine tools capable of complex multi-step operations from one machine.

Such machine tools typically hold a workpiece in a controlled position whilst a movable cutting tool acts upon the workpiece to perform the desired task. The workpiece is traditionally held such that its central longitudinal axis coincides with the rotational axis of the headstock.

Typically a CNC machine is controlled by a computer program, called a part program, which serially instructs the machine to perform a sequential series of discrete operations in a predetermined sequence so that the movable operative part moves along a programmed path determined by the part program. Each individual instruction is termed a "block" and many constitute a determining command for each or a combination of controllable axes. For example, a block may instruct a grinding wheel to move 5 mm in the Y axis at a given velocity. Multiple axis blocks may instruct a grinding wheel to rotate and move forward 0.05 mm in the X and Y axis at a given velocity. The blocks, once programmed into the computer, are then fixed in a set sequential order. The whole set of sequential blocks may then be automatically operated by the CNC machine which then operates from start to finish of the part program.

CNC machines conventionally include a trajectory interpolator and a position controller. The trajectory interpolator produces interpolated position commands from inputs representing a feed rate specification, i.e. All the data required to determine the desired feedrate along the programmed path, and high level motion commands, the machine's internal numeric representation of the data required to interpolate the machine along the desired path to the end point of the current block.

The interpolation mode comprises a specification of the geometric path to be traversed by the grinding wheel from the programmed start point to the programmed end point.

An interpolated position command is a "snap-shot" of the desired machine position at some position on the programmed path. One interpolated position command is generated by the trajectory interpolator once every machine update period.

The position controller of the CNC machine conventionally receives the interpolated position commands every machine update period and performs a control algorithm that causes the cutting tool to attempt to attain the position determined from the interpolated position command.

Conventional CNC tool grinding machines have the workpiece held by a collet with-the centre of the workpiece in line with the rotational axis of the headstock. This method is subject to inaccuracy when aligning the centre of the workpiece with the rotational axis of the headstock. Accurate alignment is essential for concentricity of the ground workpiece.

The inability to set up for workpieces of varying diameters without changing or adjusting the machine's collect reduces the flexibility and productivity of the conventional CNC tool grinding machine. The time spend on setup is unproductive and therefore undesirable.

A further limitation of the traditional collect method is limited rigidity of the length of the workpiece when subjected to the grinding means.

In order to reduce setup time and increase setup accuracy several types of workpiece clamps have been proposed.

One such mounting means which has been proposed for holding and rotating a workpiece is known alternatively as a"sidelock holder" or an "end mill holder". Such a holder assembly is fitted to the collet. The workpiece is fitted within the end of the holder. The holder assembly requires a different sized mechanism to be fitted for each different sized workpiece. This method also requires manual adjustment. The holder provides greater rigidity than conventional mounting means but the need to fit a different assembly for varying workpiece sizes and manual adjustment requirement increase set up time. As such, the holder is not very practical in a CNC machine. Further, the holder does not address the problem of accurately setting up the centre of the workpiece to coincide with the centre of the headstock.

It is therefore desirable to provide a multi-axis CNC machine including workpiece mounting assembly which is adapted to hold workpieces of a range of diameters, which provides rigid support for the workpiece and which enables concentric grinding with minimal set up time.

It is also desirable to provide a multi-axis CNC machine, and a method of operating a CNC machine, which does not require accurate alignment of the centre of the workpiece with the centre of the headstock and therefore reduces setup time.

SUMMARY OF THE INVENTION

According to one aspect of the invention there is provided a method of controlling a CNC machine having workpiece mounting means for holding a workpiece and a cutting tool operable upon the workpiece under the control of the CNC machine, the workpiece mounting means being rotatable about a first axis, the method being characterised by the steps of:

clamping the workpiece such that a longitudinal axis of the workpiece is parallel to the first axis and offset from the first axis by a known or calculated distance; and programming the CNC machine to compensate for said offset during operation of the cutting tool on the workpiece.

According to another aspect of the invention there is provided a computer numerically controlled (CNC) machine having workpiece mounting means for holding and rotating a workpiece, and a cutting tool operable upon the workpiece under the control of the CNC machine wherein the workpiece mounting means is rotatable about a first axis and includes workpiece clamping means for clamping workpieces of different transverse dimensions in such a manner that a workpiece is clamped with a longitudinal axis of the clamped workpiece parallel to the first axis, the offset between the first axis and the longitudinal axis of the workpiece being known or calculated, and wherein the CNC machine is programmed to compensate for said offset during operation of the cutting tool upon the workpiece.

The present invention is particularly applicable to CNC grinding machines for operating on workpieces having at least a cylindrical mounting portion. When such a workpiece is clamped with the central longitudinal axis of the cylindrical mounting portion extending parallel to, but offset from, the first axis, the workpiece revolves in an orbit around the first axis and, with the amount of offset being known or calculated, it is a relatively simple matter to program the CNC machine to compensate for the offset when controlling movement of the cuffing tool.

Preferably, the workpiece clamping means comprises a first clamping jaw that is fixed relative to the first axis about which the mounting means is rotatable and a second clamping jaw that is movable towards and away from the first clamping jaw. This is in contrast to rotatable chucks or collets of conventional CNC grinding machines which have a plurality of workpiece clamping jaws, each of which is movable relative to the axis of rotation of the chuck or collet.

One of the advantages of the present invention over conventional CNC grinding machines is that the workpiece clamping means can accommodate workpieces of different diameters without having to align the central longitudinal axis of each different diameter workpiece to coincide with the axis of rotation of the headstock, chuck or collet. Instead, the offset for each different diameter workpiece is already known, or can be readily calculated, and so the control program for the cutting tool of the CNC machine can automatically compensate for the offset of a particular diameter workpiece. This can result in a marked reduction in set up time when changing workpieces as opposed to conventional CNC grinding machines. Another advantage of the present invention is an increased concentricity of a ground workpiece, as inaccuracies in conventional CNC grinding machines caused by aligning the central axis of the workpiece with the rotational axis of the headstock are eliminated.

In a particularly preferred embodiment, the fixed clamping jaw of the clamping means is in the form of a V-block, having planar workpiece supporting surfaces extending at an angle relative to one another. Such a V-block provides rigid support for a clamped workpiece. Further, a V-block can be accurately formed with the planar workpiece supporting surfaces extending parallel to the axis of rotation of the mounting means. The movable clamping jaw of the clamping means may be moved towards and away from the fixed clamping jaw by any convenient operating mechanism. In one preferred arrangement, the movable clamping jaw is mounted on a pivotal lever arm. The lever arm may be conveniently pivoted by a pneumatic operating mechanism including a plunger which is engageable with a rear end of the lever arm.

BRIEF DESCRIPTION OF THE SEVERAL VIEWS OF THE DRAWINGS

A preferred embodiment of the invention will now be described, by way of example only, with reference to the accompanying drawings, in which:

FIG. 7 is a front view of the headstock and workpiece clamping device of FIG. 6;

FIG. 8 is a section through the workpiece clamping device in a retracted position; and FIG. 9 is a section through the work clamp in a clamping position;

DETAILED DESCRIPTION OF THE INVENTION

Figure 1:
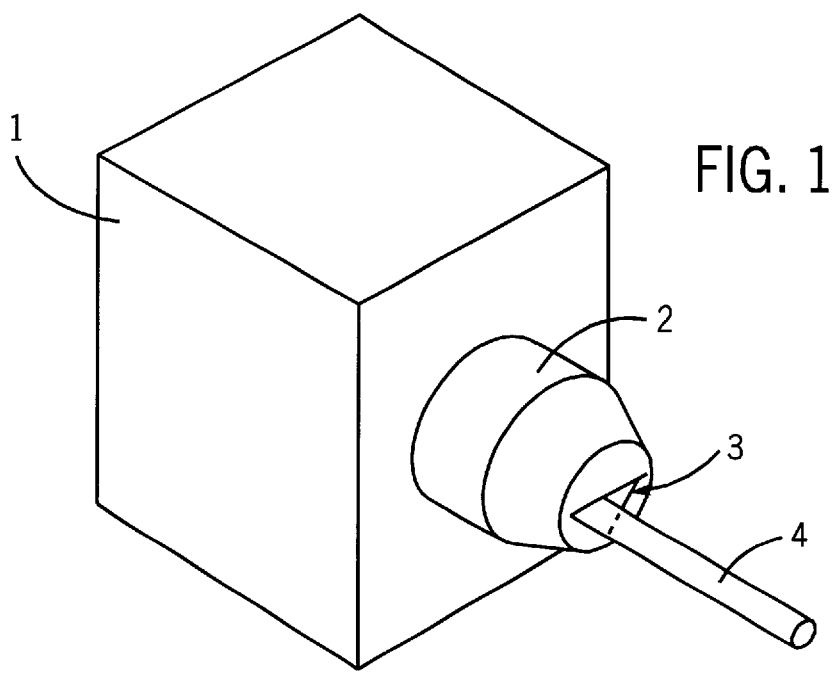
FIG. 1 is a schematic perspective view of a workpiece clamping device for clamping workpieces of different diameters in a CNC machine.
Figure 2:
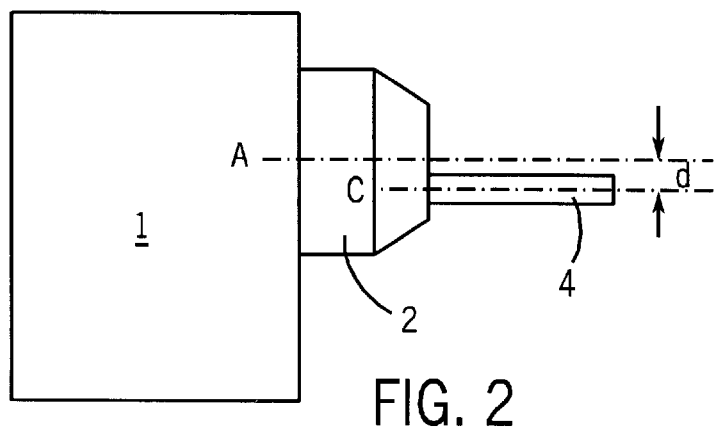
FIG. 2 is a schematic side view of the workpiece clamping device of FIG. 1.
Figure 3:
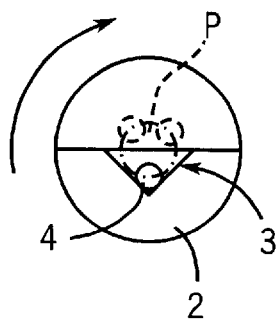
FIG. 3 is a schematic front view showing a small diameter workpiece clamped in the workpiece clamping device.
Figure 4:
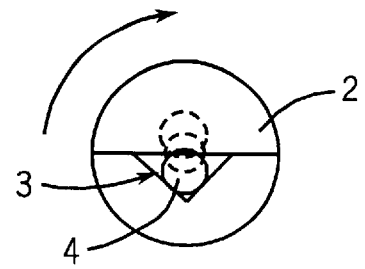
FIG. 4 is a schematic front view of a larger diameter workpiece clamped in the workpiece clamping device.

The workpiece clamping device shown in FIGS. 1 to 4 comprises a headstock 1, a chuck 2 rotatable about a generally horizontal axis A, and a V-block clamp 3 for clamping a cylindrical workpiece 4 in the rotatable chuck 2. As shown in FIGS. 2 and 3, the workpiece 4 is clamped by the V-block clamp 3 with its central longitudinal axis C extending parallel to the axis of rotation of the chuck 2. The axis C of the workpiece is offset from the axis of rotation A by a distance so that as the chuck 2 rotates, the clamped workpiece revolves in an orbital path P around the axis A. Different positions of the workpiece 4 in its orbital path are shown in broken lines in FIG. 3. FIG. 4 shows a workpiece 4' of larger diameter clamped by the V-block clamp 3.

The workpiece clamping device of FIGS. 1 to 4 forms part of a CNC multi-axis grinding machine which has a cutting tool 5 movable relative to a workpiece 4 clamped in the chuck 2 by the V-block clamp 3. For this purpose, the CNC machine has an A-axis actuator 11 for moving the cutting tool 5 in the direction of the axis of rotation A of the chuck 2, a Y-axis actuator 12 for moving the cutting tool 5 in the direction of a horizontal Y-axis perpendicular to the A axis, and a Z-axis actuator 13 for moving the cutting tool in the direction of a vertical Z axis perpendicular to the A and Y axes. In a conventional CNC machine, the A axis is usually termed the X-axis.

Figure 5:
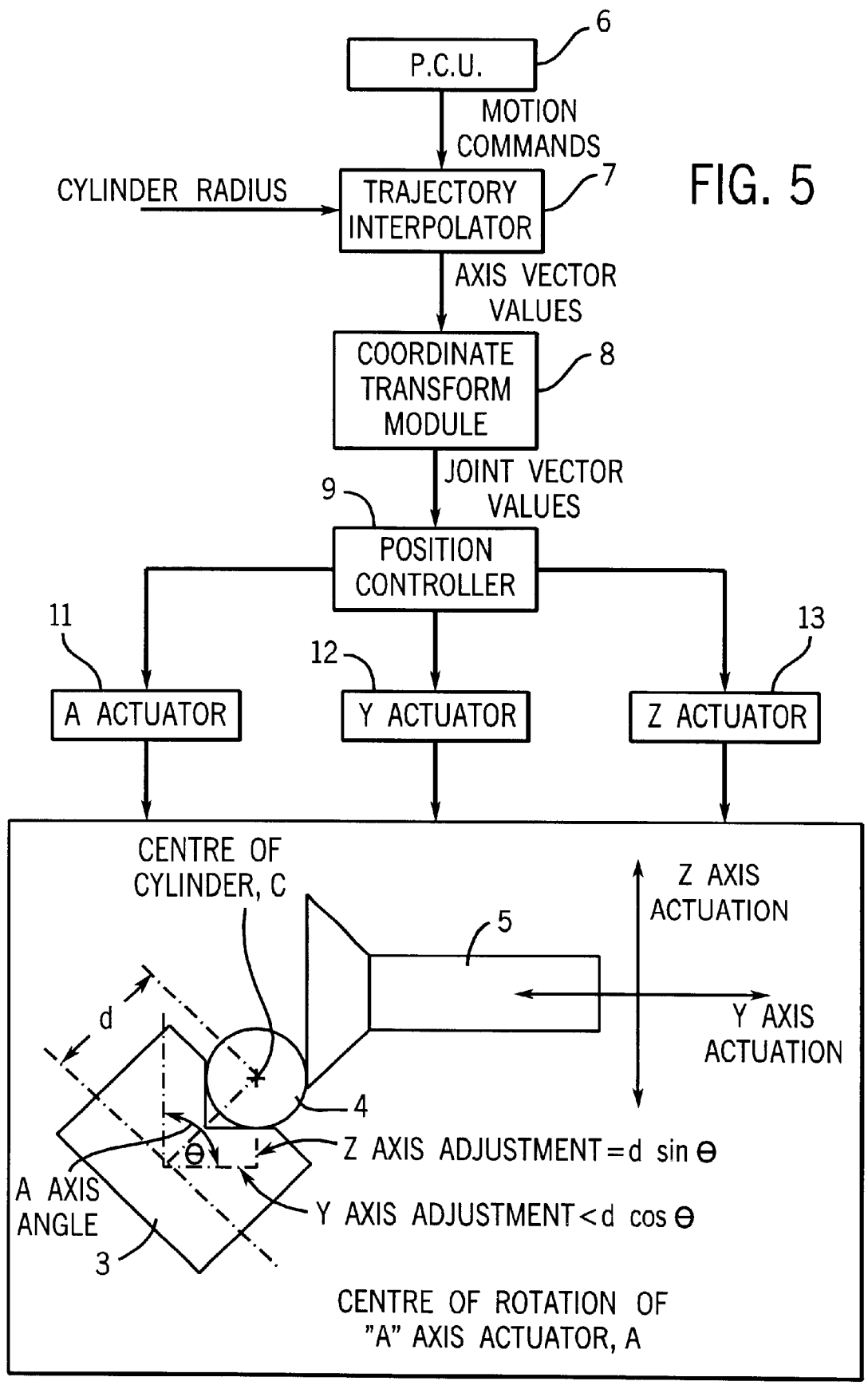
FIG. 5 is a block diagram of the control system for the cutting tool of the CNC machine.
Figure 6:
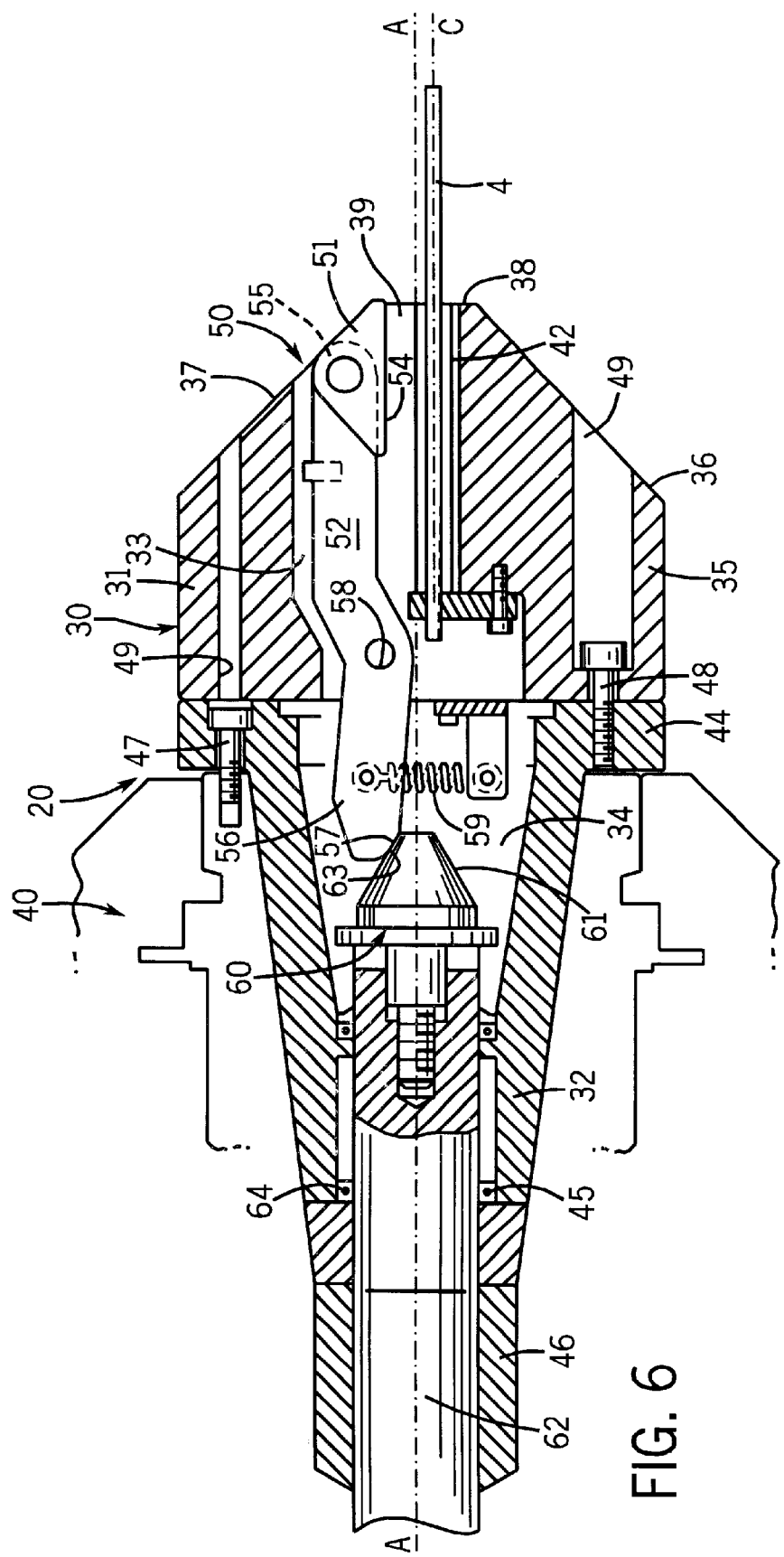
FIG. 6 is a section through a CNC machine headstock including a preferred form of a workpiece clamping device.

Movement of the cutting tool 5 by the actuators 11, 12, 13 is controlled by a computer numerical control system including a programmable control unit (PCU) 6, a trajectory interpolator 7, a co-ordinate transform module 8 and a position controller 9 as shown in FIG. 5. PCU 6 is programmed with a programmed path for the cutting tool 5. The trajectory interpolator 7 receives motion commands from the PCU 6 and calculates axis vector values which are passed to the co-ordinate transform module 8. The co-ordinate transform module 8 transforms the axis vector values into joint vector values and the position controller 9 produces position control signals from the joint vector values which are passed to the actuators 11, 12 and 13.

The control system differs from a conventional CNC machine control system in that it is programmed to compensate automatically for the offset of the workpiece axis C from the A axis of the rotatable chuck 2. This is achieved by programming the co-ordinate transform module 8 to recalculate the position command during each machine update period. The recalculated position commands control the movement of the cutting tool 5 by means of the position controller 9. This does not require complicated re-programming of a conventional CNC machine control system, because the required adjustments in the Y and Z axes can be simply calculated from the known offset d. For example, the Y-axis adjustment is d sin θ and the Z-axis adjustment is d cos θ, where θ is the angle between a vertical line passing through the A axis and the line joining the workpiece axis C and the axis of rotation A of the rotatable chuck 2 at any particular position of the workpiece 4 as it moves in its orbital path P around the axis A. Further, as the V-block clamp 3 is fixed at a constant distance away from the axis of rotation A of the chuck 2, it is a relatively simple matter to calculate the offset d from the diameter or radius of the cylindrical workpiece 4. For this purpose, the trajectory interpolator 7 may include input means for inputting cylinder radius or diameter values. Alternatively, the radius of a workpiece could be obtained by digitising.

The V-lock clamp 3 of a CNC machine in accordance with the invention can hold workpieces of a range of diameters as illustrated by FIGS. 3 and 4. It is only necessary to enter the radius of the particular workpiece clamped by the V-block clamp 3 as an input to the trajectory interpolator 7, and then the coordinate transform module 8 can automatically calculate the offset d and the required adjustments for the cutting tool 5 in the directions of the Y and Z-axes.

A preferred form of V-block clamping assembly 20 is illustrated in FIGS. 6 to 9. The clamping assembly 20 comprises a workpiece holder housing or chuck 30 secured to a rotatable headstock 40 and a pneumatically operable clamping mechanism 50.

The chuck 30 is formed from a front part 31 and a rear part 32, each of which is of hollow form having a respective cavity 33, 34 to receive the clamping mechanism 50. The front part 31 has a cylindrical rear portion 35 and a frustoconical front portion 36 having a conical surface 37 extending forwardly from the cylindrical rear portion 35 to a flat front end surface 38. A workpiece-receiving opening 39 is provided in the front end surface 38 and extends rearwardly to the cavity 33. The lower part of the opening 39 has inclined planar surfaces 41 which form a fixed, V-shaped jaw 42 of the V-block clamping assembly. The V-shaped jaw 42 is fixed relative to the central axis of rotation A of the headstock 40 and chuck 30. The upper part of the opening 39 has a part circular surface 43.

The rear part 32 of the chuck 30 has a front portion in the form of an annular flange 44, a tapered intermediate portion 45 extending rearwardly from the front portion 44 and a cylindrical rear portion 46 at the rear end of the tapered intermediate portion 45. The annular flange 44 is secured to the front end of the headstock 40 by fixing screws 47 and the cylindrical rear portion 35 of the front part 31 is secured to the annular flange 44 by fixing screws 48.

Longitudinally extending bores 49 extend rearwardly from the conical surface 37 of the front part 31 of the chuck 30 to allow access to the fixing screws 47, 48 so that they can be tightened or loosened for assembly or disassembly from the front of the chuck 30 by means of a suitable tool, such as an alien key.

The clamping mechanism 50 comprises a movable clamping jaw 51 which is movable up and down towards and away from the V-shaped jaw 42 of the chuck 30 by a lever arm 52 and a pneumatically operated plunger 60. The movable jaw 51 is in the form of a self-centering pressure pad having a V-shaped lower surface 54 which is engageable with the upper part of a cylindrical workpiece 4 in the extended position shown in FIG. 9 to clamp the workpiece 4 between the movable jaw 51 and the V-shaped jaw 42 of the chuck 30.

The clamping jaw 51 is generally triangular in side view and is pivotally mounted on the front end 55 of the lever arm 52. The rear end 56 of the lever arm 52 has a curved surface 57 and the lever arm 52 is arranged to pivot within the cavity 33 in the front part 31 of the chuck 30 about an intermediate pivotal mounting 58.

The pneumatically operated plunger 60 comprises a frustoconical plunger head 61 provided on the front end of a piston rod 62 which extends forwardly from pneumatic cylinder (not shown) into the cavity 34 in the rear part 32 of the chuck 30. The plunger head 61 has a conical surface 63 which engages the curved surface 57 of the rear end 56 of the lever arm 52. The piston rod 62 is guided for longitudinal movement relative to the rear part 32 of the chuck 30 by bearings 64. When the piston rod 62 and plunger head 61 are advanced under pneumatic pressure the rear end 56 of the lever arm 52 is raised, as shown in FIG. 9. This lowers the front end of the lever arm 52 to move the clamping jaw 51 down towards the V-shaped jaw 42 of the chuck 30 to clamp a workpiece 4 for a machining operation. The pivotal mounting of the movable clamping jaw 51 enables the jaw 51 to engage a workpiece 4 over the entire length of the jaw 51. This provides more rigid clamping and assists in increased accuracy of grinding during a machining operation.

The rear end 56 of the lever arm 52 is connected by a spring 59 to a fixed anchor point in the chuck 30. The spring 59 urges the rear end 56 of the lever arm 52 into its lower position when the piston rod 62 and plunger head 61 are retracted. This raises the front end of the lever arm 52 to allow a previously clamped workpiece 4 to be removed from the chuck 30 after completion of a machining operation.

As described above with reference to FIGS. 1 to 4, the V-block clamping assembly 20 is arranged to clamp workpieces of different diameters with the central longitudinal axis C of a clamped workpiece 4 being offset from the axis of rotation A of the rotatable chuck 30 and headstock 40 by a distance d. There is, however, one particular diameter of workpiece for which the central axis C of the workpiece 4 will coincide with the axis A. This does not, however, affect the programming or operation of the CNC machine because d=0 for this special case.

The V-block clamping assembly described above is particularly advantageous in that it provides rigid support for a workpiece. This is in addition to other advantages of the present invention which include: less runout than conventional workpiece mounting assemblies; better repeatability; increased concentricity of the ground workpiece; and the flexibility of handling workpieces of varying diameters with a reduction in setup time as compared with conventional CNC grinding machines.

It will be appreciated that various modifications may be made to the preferred embodiment described above without departing from the scope and spirit of the invention. For example, it is conceivable that a different type of workpiece clamping arrangement from the V-block clamping assembly could be used in the broad method of the present invention.

What is claimed is:

1. A computer numerically controlled (CNC) machine having a machine co-ordinate system, a workpiece mounting means for holding and rotating a workpiece, the workpiece having a longitudinal axis, the machine having a movable-cutting tool operable upon the workpiece under the control of the CNC machine, wherein the workpiece mounting means is rotatable about a first axis of the machine coordinate system and includes workpiece clamping means for clamping workpieces of different dimensions transverse to the longitudinal axis in such a manner that a workpiece is clamped with the longitudinal axis of the clamped workpiece parallel to, but offset from, the first axis, the amount of the offset being determinable by measurement or calculation by the CNC machine and wherein the CNC machine is programmed to use the determined amount of the offset to automatically compensate for said offset during operation of the cutting tool upon the workpiece.

2. A CNC machine according to claim 1 wherein the workpiece clamping means comprises a first clamping jaw that is fixed relative to the first axis about which the mounting means is rotatable and a second clamping jaw that is movable towards and away from the first clamping jaw.

3. A CNC machine according to claim 2 wherein the fixed clamping jaw of the clamping means is in the form of a V-block, having planar workpiece supporting surfaces extending at an angle relative to one another.

4. A CNC machine according to claim 2 wherein the movable clamping jaw is mounted on a pivotal lever arm.

5. A CNC machine according to claim 4 wherein the pivotal lever arm is pivotable by an operating mechanism including a plunger engageable with an end of the lever arm.

6. A CNC machine according to claim 5 wherein the operating mechanism is pneumatically operable.

7. A CNC machine according to any one of claims 1 wherein movement of the cutting tool is controlled by a control system including a programmable control unit, a trajectory interpolator, a co-ordinate transform module and a piston controller.

8. A CNC machine according to claim 7 wherein the co-ordinate transform module is programmed to re-calculate position commands for the cutting tool to compensate for said offset.

9. A CNC machine according to claim 8 wherein said machine co-ordinate system has Y- and Z-axes normal to said first axis, and wherein the co-ordinate transform module is programmed to utilize said offset to calculate required adjustments in the Y- and Z-axes movements of the cutting tool.

10. A CNC machine according to claim 9 wherein the CNC machine calculates the offset from the diameter or radius of a cylindrical clamped portion of the workpiece.

11. A CNC machine according to claim 10 wherein the control system includes input means for inputting cylinder diameter or radius values.

12. A CNC machine according to claim 10 including digitising means for determining the diameter or radius of a workpiece.

13. A CNC machine according to claim 1 wherein said workpiece has at least a cylindrical mounting portion which is clamped with a central longitudinal axis of the cylindrical mounting portion extending parallel to, but offset from, the first axis so that the workpiece revolves in an orbit around the first axis, and the CNC machine is programmed to compensate automatically for said offset when controlling movement of the cutting tool.

14. A CNC machine according to claim 13 wherein the CNC machine calculates the offset from the diameter or radius of the cylindrical mounting portion of the workpiece.

15. A CNC machine according to claim 14 including digitising means for determining the diameter or radius of the workpiece.

16. A CNC machine according to claim 1 wherein the CNC machine is programmed to recalculate position commands for the cutting tool to compensate for said offset.

17. A CNC machine according to claim 1 wherein said machine co-ordinate system has Y- and Z-axes normal to said first axis, and wherein required adjustments for the cutting tool in the Y- and Z-axes to compensate for said offset are calculated from said offset d, the Y-axis adjustment being $d \sin \theta$ and the Z-axis adjustment being $d \cos \theta$, where $\theta$ is the angle between a vertical line passing through the first axis and the line joining the longitudinal axis of the workpiece and the first axis at any particular position of the workpiece.

18. A computer numerically controlled (CNC) machine having a machine co-ordinate system, a workpiece mounting means for holding and rotating a workpiece, the workpiece having a longitudinal axis, the machine having a movable cutting tool operable upon the workpiece under the control of the CNC machine, the workpiece mounting means being rotatable about a first axis of the machine coordinate system and including workpiece clamping means having a first clamping jaw and a second clamping jaw, the second clamping jaw being movable towards and away from the first clamping jaw, and wherein the first clamping jaw comprises a V-block, having planar workpiece supporting surfaces extending substantially parallel to the first axis and at an angle relative to each other, the workpiece being clamped in said workpiece clamping means with a longitudinal axis of the workpiece extending parallel to, but offset from, said first axis, the amount of the offset being determinable by measurement or calculation by the CNC machine, said CNC machine being programmed to use the determined amount of the offset to automatically compensate for said offset during operation of the cutting tool on the workpiece.

19. A CNC machine according to claim 18 wherein the first clamping jaw is fixed relative to the first axis.

20. A CNC machine according to claim 18 wherein the second clamping jaw is mounted on a pivotal lever arm.

21. A CNC machine according to claim 20 wherein the second clamping jaw is mounted on a front end of the lever arm, and the lever arm is pivotable by an operating mechanism including a plunger engageable with a rear end of the lever arm.

22. A CNC machine according to claim 21 wherein the second clamping jaw is pivotally mounted on a front end of the lever arm.

23. A CNC machine according to claim 21 wherein the plunger of the operating mechanism is pneumatically advanced to move the second clamping jaw towards the first clamping jaw.

24. A CNC machine according to claim 21 wherein the second clamping jaw is urged away from the first clamping jaw when the plunger is retracted.

* * * * *